United States Patent [19]
Kostikov et al.

[11] 4,435,538
[45] Mar. 6, 1984

[54] COMPOSITION FOR THE PREPARATION OF CARBONACEOUS BASE USE IN THE MANUFACTURE OF SILICONIZED ANTIFRICTION MATERIALS

[76] Inventors: Valery I. Kostikov, ulitsa Marii Ulyanovoi, 9, korpus 2, kv, 12, Moscow; Jury I. Koshelev, Oktyabrsky prospekt, 365, kv. 8; Vasily D. Telegin, Oktyabrsky prospekt, 306, kv. 71, both of Ljubertsy Moskovskoi oblasti; Alexandr S. Tarabanov, ulitsa Sayanskaya, 6, kv. 123, Moscow; Elena Tatievskaya, Strastnoi bulvar, 13a, kv. 32, Moscow; Lyana I. Kosova, Zeleny prospekt, 11a, kv. 18, Moscow, all of U.S.S.R.

[21] Appl. No.: 346,035
[22] PCT Filed: Jun. 9, 1980
[86] PCT No.: PCT/SU80/00102
  § 371 Date: Jan. 26, 1982
  § 102(e) Date: Jan. 26, 1982
[87] PCT Pub. No.: WO81/03486
  PCT Pub. Date: Dec. 10, 1981
[51] Int. Cl.³ .............................................. C08K 3/34
[52] U.S. Cl. ..................................... 524/492; 524/496
[58] Field of Search .............................. 524/492, 496

[56] References Cited
U.S. PATENT DOCUMENTS 2,581,301  1/1952  Saywell .............................. 524/496
3,969,124  7/1976  Stewart .............................. 264/81
4,316,834  2/1982  Ueda et al. ......................... 524/496

Primary Examiner—Lewis T. Jacobs
Attorney, Agent, or Firm—McAulay, Fields, Fisher, Goldstein & Nissen

[57] ABSTRACT

A composition for the preparation of a carbonaceous base to be used in the manufacture of siliconized antifriction materials comprising the following components, per cent by weight:

| | |
|---|---|
| carbonaceous filler | 65 to 85 |
| phenolformaldehyde resin | 12 to 30 |
| sital | 3 to 5. |

Said sital consists of the following ingredients, per cent by weight: $Al_2O_3$—10-12, CaO—12-14, MgO—9-11, $Na_2O$—5-6, $SiO_2$—the balance.

4 Claims, No Drawings

COMPOSITION FOR THE PREPARATION OF CARBONACEOUS BASE FOR USE IN THE MANUFACTURE OF SILICONIZED ANTIFRICTION MATERIALS

FIELD OF THE INVENTION

The present invention relates to compositions for the preparation of a carbonaceous base for use in the manufacture of siliconized antifriction materials.

BACKGROUND OF THE INVENTION

Known in the art is a composition for the preparation of a carbonaceous base employed in the manufacture of siliconized antifriction materials. This composition comprises a powder-like carbonaceous filler a petroleum coke and a binder-phenolic thermosetting resin such as phenolformaldehyde resin (cf. British Pat. No. 1,394,106 Cl. C 01 B 31/36, published May 14, 1975).

However, siliconized antifriction materials based on the above-mentioned composition have insufficient mechanical strength (compression strength not more than 4,500 kgf/cm$^2$) and resilience (not more than 3 kgf.cm/cm$^2$), as well as a low wear-resistance in liquid media containing abrasive impurities and in bulk materials (the wear rate is 0.055 mm/1.000 hrs.). Furthermore, these antifriction materials are insufficiently resistant to wear in agressive liquids such as solutions of acids and alkalis (the rate of wear is 0.129 mm/1,000 hrs).

DISCLOSURE OF THE INVENTION

The present invention is directed to the provision of such a composition for the preparation of a carbonaceous base to be used in the manufacture of siliconized antifriction materials with improved mechanical strength characteristics and a low rate of wear in liquid media containing abrasive matter, in neutral and agressive liquid media, in fluid media as well.

This object is accomplished by a composition for the preparation of a carbonaceous base to be used in the manufacture of antifriction materials consisting of a carbonaceous filler, phenolformaldehyde resin and a devitrified glass material (sital) having the following components, percent by weight: Al$_2$O$_3$—10-12, CaO—12-14, MgO—9-11, Na$_2$O—5-6, SiO$_2$—the balance: the composition contains the ingredients in the following proportions, percent by weight:

| carbonaceous filler | 65 to 85 |
| phenolformaldehyde resin | 12 to 30 |
| sital | 3 to 5. |

As the carbonaceous filler in the composition according to the present invention use can be made of a carbonaceous powder with a particle size of from 0.01 to 0.5 mm.

It is also advisable to use carbon fibres as the carbonaceous filler.

Furthermore, as the carbonaceous filler in the composition according to the present invention use can be made of a mixture of carbon fibres with carbon powder at a weight ratio therebetween of from 1:1 to 1:5 respectively.

The above-specified proportions of the ingredients in the composition according to the present invention is optimal and ensures the best characteristics of siliconized antifriction materials.

The composition according to the present invention makes it possible to obtain siliconized antifriction materials having an increased wear-resistance (wear rate is 0.010 to 0.031 mm/1,000 hrs) which in turn enables the use of these antifriction materials in friction assemblies operating in neutral and aggressive liquid media, liquid media with abrasive matter and in fluid media as well.

The pressure of sital in the composition according to the present invention contributes to a higher wear-resistance of siliconized antifriction materials in aggressive liquid media.

Siliconized antifriction materials produced from the composition of the above-specified formulation have improved mechanical strength characteristics: compression strength is 4,500 to 5,500 kgf/cm$^2$, resilience —2.2-22.0 kgf.cm/cm$^2$.

BEST MODE FOR CARRYING OUT THE INVENTION

The composition according to the present invention is prepared by mixing a carbonaceous filler, phenolformaldehyde resin and sital in the predetermined proportions.

As the carbonaceous filler in the composition according to the present invention use is made of a carbon powder such as a powder of artificial graphite, coal, coke (petroleum, coal-tar, phenolic), as well as a mixture of carbon powders in any proportions thereof. Furthermore, as the carbonaceous filler according to the present invention use can be made of a carbon fibre of different length or a mixture of carbon fibres with a carbon powder at a weight ratio therebetween of from 1:1 to 1:5 respectively.

In the case of use of a powder-like carbon filler in the composition according to the present invention, it is advisable that phenolformaldehyde resin be used in the power-like form. When carbon fibres or their mixture with a carbon powder is used as the filler, it is advisable that phenolformaldehyde resin be preliminarily dissolved in an organic solvent such as acetone, ethanol.

The carbonaceous filler amounts to 65-85% by weight of the composition according to the present invention.

The sital incorporated in the composition according to the present invention comprises a powder-like mixture of oxides, percent by weight: Al$_2$O$_3$—10-12, CaO—12-14, MgO—9-11, Na$_2$O—5-6, SiO$_2$—the balance, with a particle size of from 20 to 50 μm; it amounts to 3-5% by weight of the composition.

The sital of the above-specified composition comprises a product of glass crystallization. The sital is obtained in any conventional way comprising a high-temperature stepwise heat-treatment of glass at a temperature within the range of from 1,000° to 1,800° C. During this heat-treatment glass is converted into a fine-crystal material (sital) containing tiny crystals uniformly distributed within its entire volume.

The composition produced by blending of the above-specified ingredients is employed for the preparation of a carbonaceous base which is, in turn, intended for use in the manufacture of siliconized antifriction materials.

The carbonaceous base is produced from the composition according to the present invention by compression-moulding and subsequent annealing of the resulting blanks and articles at a temperature within the range of from 900° to 1,100° C. in inert gas atmosphere or in vacuum. After annealing articles are produced from the blanks by machining.

From the carbonaceous base siliconized antifriction materials are produced by a conventional method comprising impregnation of the carbonaceous base (i.e. annealed articles or articles produced from annealed blanks) with a melt of silicon at a temperature of from 1,900° to 2,100° C. in the atmosphere of inert gases or in vacuum.

For a better understanding of the present invention some specific examples illustrating its particular embodiments are given hereinbelow. The data on mechanical strength and wear-resistance of siliconized antifriction materials produced according to Examples 1 to 6 and British Pat. No. 1,394,106 are given in the Table following the Examples.

EXAMPLE 1

A carbon powder in the amount of 65% by weight with a particle size of from 0.01 to 0.5 mm, a sital powder in the amount of 5% by weight (sital containing, percent by weight: $Al_2O_3$—10, CaO—12, MgO—9, $Na_2O$—5, $SiO_2$—the balance) with a particle size of from 20 to 50 μm are mixed with a powder of phenolformaldehyde resin in the amount of 30% for 15 minutes. The resulting composition is compression moulded at the temperature of 170° C. under the pressure of 100 kgf/cm². The articles are calcined at the temperature of 1,000° C. in the vacuum of $10^{-1}$ mm Hg. The articles are heat-treated at the temperature growth rate of 50° C./hr, the time of residence at the final temperature is one hour. The calcined articles (carbonaceous base) are cooled to 200°–300° C. and impregnated with a melt of silicon at the temperature of 1,950° C. in the vacuum of $10^{-1}$ mm Hg to give articles of a siliconized antifriction material.

EXAMPLE 2

A carbon powder in the amount of 76%, a sital powder in the amount of 4% by weight containing, percent by weight: $Al_2O_3$—11, CaO—13, MgO—10, $Na_2O$—6, $SiO_2$—the balance, are mixed with 20% by weight of a powder of phenolformaldehyde resin to give the base composition. Further operations for the production of a carbonaceous base from this composition and a siliconized antifriction material from this carbonaceous base are similar to those described in Example 1 hereinbefore.

EXAMPLE 3

A carbon powder in the amount of 85% by weight, a sital powder in the amount of 3% by weight (containing the components specified in Example 1) are mixed with 12% by weight of a powder of phenolformaldehyde resin to produce a composition. Further operations for the production of a carbonaceous base from this composition and a siliconized antifriction material from this base are similar to those described in Example 1.

EXAMPLE 4

Carbon fibres with a length of from 20 to 40 mm in the amount of 76% by weight, a sital powder in the amount of 4% by weight (with the composition specified in Example 1) are mixed with 20% by weight of phenolformaldehyde resin. The resin is preliminarily dissolved in ethanol at the weight ratio therebetween of 1:1. The resulting ethanolic mixture is dried in a drying cabinet at a temperature of from 80° to 100° C. for 30 minutes. Further operations are similar to those described in Example 1 hereinbefore.

EXAMPLE 5

Carbon fibres with a length of 10 to 20 mm in the amount of 40% by weight, a carbon powder in the amount of 40% by weight, a sital powder in the amount of 4% by weight (the sital composition is the following, percent by weight: $Al_2O_3$—12, CaO—14, MgO—11, $Na_2O$—6, $SiO_2$—the balance) are mixed with 16% by weight of phenolformaldehyde resin. Preliminary dissolution of the resin and all further operations are similar to those described in Example 4.

EXAMPLE 6

Carbon fibres with a length of from 40 to 60 mm in the amount of 12% by weight, a carbon powder in the amount of 60% by weight, a sital powder in the amount of 5% by weight (the sital composition is specified in Example 5 hereinabove) are mixed with 23% by weight of phenolformaldehyde resin. Preliminary dissolution of the resin and all further operations are similar to those described in Example 4.

The siliconized antifriction materials prepared in the foregoing Examples 1 to 6 and according to British Pat. No. 1,394,106 have been tested for wear-resistance, compression strength and resilience.

Testing for wear-resistance in water containing sand with a particle size of from 20 to 40 μm at the concentration of the latter of 10% by weight is carried out under the load of 50 kgf/cm² at the gliding speed of 3 m/sec. The testing temperature is 80° C. The wear-resistance value is assessed through the wear rate.

Testing for wear-resistance in a 50% aqueous solution of caustic soda is carried out under the same load, gliding speed and temperature as indicated hereinabove.

As it follows from the Table given hereinbelow, the use of the present invention makes it possible to increase compression strength of siliconized antifriction materials by 20%, resilience—by 7 times, reduce the rate of wear in liquid media containing abrasive matter by 2–5 times and lower the rate of wear in aggressive liquid media by 4–8 times as compared to similar characteristics of the siliconized antifriction material produced by the conventional method disclosed in British Pat. No. 1,394,106.

INDUSTRIAL APPLICABILITY

The composition according to the present invention is useful in the preparation of a carbonaceous base which, in turn, can be employed in the manufacture of siliconized antifriction materials. The latter can be used in the mechanical engineering and other industries for the manufacture of plan bearings and end face sealings in centrifugal pumps and equipment for transportation of neutral and aggressive liquids, as well as liquids containing abrasive matter such as scale, clay, sand, etc. of various particle size and bulky materials.

TABLE

| Example No. | Density, g/cm³ | Compression strength, kgf/cm² | Resilience, kgf·cm/cm² | Rate of wear in water containing 10% of sand, mm/1,000 hrs | Rate of wear in 50% aqueous solution of caustic soda, mm/1,000 |
|---|---|---|---|---|---|
| 1 | 2.35 | 4.500 | 2.2 | 0.010 | 0.015 |
| 2 | 2.50 | 4.800 | 3.5 | 0.015 | 0.019 |
| 3 | 2.62 | 5.200 | 3.7 | 0.020 | 0.028 |
| 4 | 2.65 | 5.500 | 22.0 | 0.026 | 0.031 |
| 5 | 2.45 | 4.650 | 9.0 | 0.022 | 0.029 |
| 6 | 2.40 | 4.550 | 6.0 | 0.017 | 0.021 |

TABLE-continued

| Example No. | Density, g/cm³ | Compression strength, kgf/cm² | Resilience, kgf·cm/cm² | Rate of wear in water containing 10% of sand, mm/1,000 hrs | Rate of wear in 50% aqueous solution of caustic soda, mm/1,000 |
| --- | --- | --- | --- | --- | --- |
| | 2.60 | 4.500 | 3.0 | 0.055 | 0.129 |

British Patent No. 1,394,106

We claim:

1. A composition for the preparation of a carbonaceous base for use in the manufacture of siliconized antifriction materials comprising a carbonaceous filler and phenolformaldehyde resin, characterized in that it also incorporates a sital of the following composition (percent by weight): $Al_2O_3$—10-12, CaO—12-14, MgO—9-11, $Na_2O$—5-6, $SiO_2$—the balance, the components being present in the following proportions, percent by weight:

| | |
| --- | --- |
| carbonaceous filler | 65 to 85 |
| phenolformaldehyde resin | 12 to 30 |
| sital | 3 to 5. |

2. A composition according to claim 1, characterized in that as the carbonaceous filler it incorporates a carbon powder with a particle size of from 0.01 to 0.5 mm.

3. A composition according to claim 1, characterized in that as the carbonaceous filler it contains carbon fibres.

4. A composition according to claim 1, characterized in that as the carbonaceous filler it contains a mixture of carbon fibres with a carbon powder at a weight ratio therebetween of from 1:1 to 1:5 respectively.

* * * * *